Figure 1:
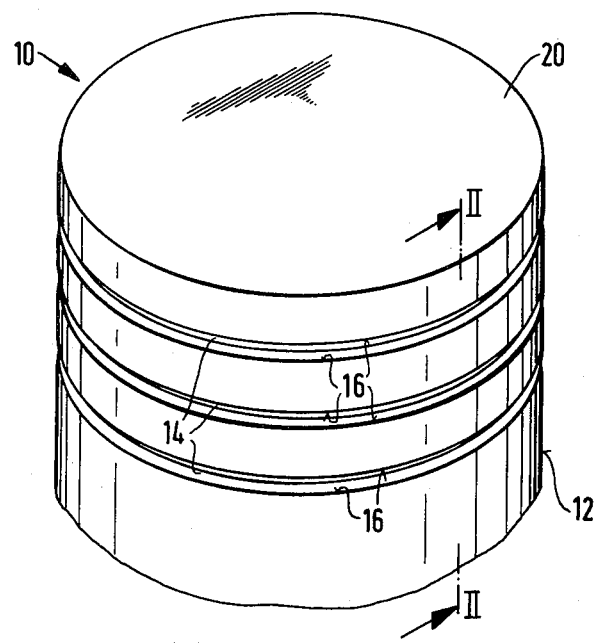

United States Patent [19]

Hiller

[11] 4,360,956
[45] Nov. 30, 1982

[54] PISTON HAVING AT LEAST ONE PISTON RING GROOVE

[75] Inventor: Walther Hiller, Puchheim, Fed. Rep. of Germany

[73] Assignee: Steigerwald Strahltechnik GmbH, Puchheim, Fed. Rep. of Germany

[21] Appl. No.: 64,607

[22] Filed: Aug. 7, 1979

[30] Foreign Application Priority Data

Aug. 11, 1978 [DE] Fed. Rep. of Germany ....... 2835332

[51] Int. Cl.³ .............................................. B23P 15/10
[52] U.S. Cl. ................................. 29/156.5 R; 92/222; 219/121 EM; 219/121 LM; 277/189.5
[58] Field of Search ............... 29/156.5 R; 92/222; 277/189.5; 219/121 L, 121 LM, 121 LE, 121 LF, 121 EF, 121 EG, 121 EM, 121 EB; 123/193 P

[56] References Cited

U.S. PATENT DOCUMENTS

| | | | |
|---|---|---|---|
| 3,711,908 | 1/1973 | Broers | 219/121 LM |
| 3,807,014 | 4/1974 | Hummel | 29/156.5 R |
| 3,914,574 | 10/1925 | Hill et al. | 277/189.5 |
| 4,074,616 | 2/1978 | Gale et al. | 277/189.5 |
| 4,233,490 | 11/1980 | Shalai et al. | 277/189.5 |

OTHER PUBLICATIONS

Railway Locomotives & Cars, "Aluminum Pistons-A New Approach," Aug., 1955, pp. 64-68.
Iron Age, "Laser Right on the Beam for Heat Treating Duty", Feb. 10, 1975, pp. 45-47.

*Primary Examiner*—George L. Walton
*Attorney, Agent, or Firm*—Edwin E. Greigg

[57] ABSTRACT

A piston made of an aluminum alloy has at least one piston ring groove defined by two side walls and a bottom wall. At least one preferably both side walls of the piston ring groove(s) are formed or defined by a zone, which has been hardened by an energy beam remelting process. The remelted zone may comprise alloy elements other than or more concentrated than the alloy elements comprised in the other portion of the piston, said additional alloy elements being introduced into said zone in the course of the remelting process. Each piston ring groove side wall may be formed by an individual remelted zone, or both sidewalls of a piston ring groove may be formed by the same remelted zone. The additional alloy elements may be applied in the form of a layer or a wire to the location of the surface of the piston, where subsequently a remelted zone is formed by the energy beam. The energy beam is preferably an electron beam, however, ion and laser beams may also be used.

4 Claims, 2 Drawing Figures

U.S. Patent

Nov. 30, 1982

4,360,956

PISTON HAVING AT LEAST ONE PISTON RING GROOVE

The present invention relates to a piston having at least one piston ring groove. Further, the invention relates to a method for manufacturing a piston of this type.

BACKGROUND OF THE INVENTION AND PRIOR ART

The piston and the piston rings seated in piston ring grooves of the piston of an internal combustion engine, as a car engine, are a wear-prone system, which essentially affects the useful lifetime of the entire engine. Similar problems exist also with other high-duty pistons, e.g. pistons of piston compressors, injection pumps and similar apparatus.

German Offenlegungsschrift 24 15 501 discloses already a method for treating the surface of workpieces or intermediate products made of aluminum or aluminum alloys, wherein a layer is applied to the surface of the workpiece, said layer comprising at least one of the metals vanadium, chromium, manganese, iron, cobalt or nickel, and the layer is fused with the basic material of the workpiece by means of an electron beam. Then, the workpiece may be finished to the final form by a machining process.

German Offenlegungsschrift 21 34 662 discloses a method of improving the mechanical strength of workpieces subject to heat-stresses, as valves of internal combustion engines, wherein a surface layer of an area, in which cracks are likely to occur, is fused to a certain depth by means of an electron beam treatment. The method is disclosed with reference to austenitic alloys comprising chromium, manganese and nickel.

German Offenlegungsschrift 24 56 856 discloses a method of producing a coating on a surface on an article, wherein a surface layer of the article is fused with addition of an additional material, and resolidified. This method is used for iron materials including all types of cast iron and steel types.

The problems of improving the wear-resistance of a piston ring groove in a piston made of an aluminum alloy is not dealt with in the above discussed prior art.

OBJECTS OF THE INVENTION

It is an object of the present invention to provide a piston having a body made of an aluminum alloy, and at least one piston ring groove, which has a longer useful life than the known pistons.

THE INVENTION

According to the invention, a piston is provided which has a body member made of an aluminum alloy and having at least one piston ring groove in said body; said groove being defined by two lateral or sidewalls, and a bottom wall. According to the invention, at least one, preferably both sidewalls of the groove are formed by a zone of said body which is hardened by an energy-beam remelting process.

It has been found that the wear of the sidewalls of a piston ring groove formed in a cylindrical sidewall of the piston and suporting one or several piston rings, is an essential factor determining the lifetime of the piston/piston-ring system, because the piston ring is no more exactly supported and, thus, subject to more heavy stresses, when the piston ring groove has become wider because of the wear of the sidewalls and therefore cannot provide anymore an accurate seat for the piston ring.

Further aspects, features and advantages of the invention will become apparent when reading the following description of preferred emmbodiments.

Figure 2:
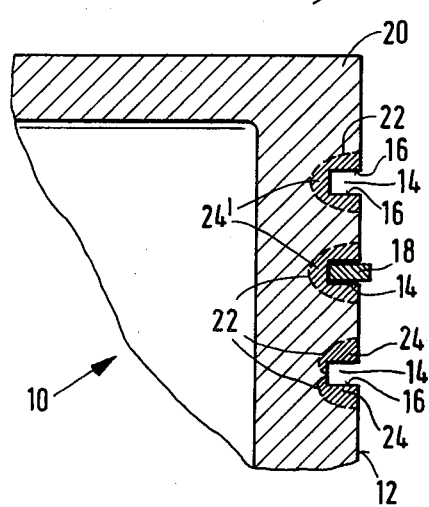

IN THE DRAWINGS:

FIG. 1 shows a perspective, simplified view of a piston of an internal combustion engine having a cylindrical sidewall in which several piston ring grooves are provided, and FIG. 2 is an axial section of the piston according to FIG. 1 showing piston ring grooves according to two different embodiments of the invention.

FIG. 1 shows the upper portion of a piston of an internal combustion engine, as an automobile engine. The piston has a body 10 forming a cylindrical sidewall 12 in which a number of annular piston ring grooves 14 is provided. The piston ring grooves are defined in an axial direction of the piston by sidewalls 16 (FIG. 2). The piston ring grooves 14 serve for receiving and supporting one or several piston rings, one of which being shown in section at 18 in FIG. 2.

According to the invention, at least one, preferably both sidewalls 16 of one or a plurality of piston ring grooves 14, preferably of all piston ring grooves, are hardened by an energy beam remelting process. The remelting process is preferably performed by means of an electron beam.

The term "remelting" or "remelting process" is intended to mean in the context of this specification and the appended claims as a process, wherein a limited zone of the body of the piston is melted by energy supplied by the energy beam, and thereafter resolidifies.

If the type of alloy of the material of the piston body 10 is appropriate the remelting process alone can improve the hardness and strength of the remelted zone with respect to the untreated portion of the body. Such hardening effect may be caused by changing the structure of the material by the energy beam remelting process which is generally characterized by a limited application of energy and a correspondingly quick resolidification. Thus, the sidewalls and, if desired, the bottom wall of a piston ring groove may be formed by a remelted zone 22 (FIG. 2) which has the same average composition as the remaining portion 20 of the piston body.

According to a preferred embodiment of the invention, additional alloy elements which increase the mechanical strength or hardness are introduced in the remelted zone 22 in the course of the remelting process. Suitable alloy elements which can be additionally introduced into the remelted zone 22 are the metals vanadium, chromium, manganese, iron, cobalt and nickel singly or in combination. Nickel being the preferred additional alloy element. It is not essential whether or not the basic material of the piston body comprises already a low proportion of any of those metallic elements, as usual in aluminum alloys used for piston bodies.

The strength improving remelting process is preferably performed before the piston ring grooves are formed in the body of the piston, as by machining, and preferably before the outer surface of the piston is finished. Thus, a remelted track or zone is formed in the piston body by an energy beam, as an electron beam, said zone having normally a generally parabolic cross section and having a depth which is preferably slightly greater than the depth of the groove to be formed.

According to a preferred embodiment of the invention, a remelted zone 24 is formed at the future location of each sidewall of the piston ring groove 16' to be formed (FIG. 2, bottom).

Alternatively, a single remelted zone 24 of such size and depth may be produced, that it covers the location of both sidewalls 16 of the corresponding piston ring groove 14, as shown with the upper two piston ring grooves 14 in FIG. 2.

Preferably, any additional alloy element to be introduced in the remelted zone is applied in form of a layer onto the outer surface of the piston body before the remelting step is performed, the width of the layer being generally at least equal to or somewhat greater than the width of the remelted zone at the piston surface. The thickness of such layer or the amount of additional alloy element(s) per square unit of the layer is chosen in accordance with the desired mean content of the respective alloy element in the remelted zone.

Alternatively, the additional alloy element(s) may be applied in the form of a wire. For this purpose, the cylindrical surface of the piston body may be provided with a groove dimensioned to match the cross section of the wire and having preferably a depth about equal to the diameter of the wire. In any case, the wire consisting of or comprising the additional alloy elements should have a diameter which is smaller than the axial width of the remelted zone to be formed; preferably the cross section area of such wire is about one tenth to one twentieth of the cross section of the remelted zone.

A further alternative is to fuse a wire or band consisting of or comprising the additional alloy elements to a narrow region of the surface of piston body before the remelting process proper is performed. The cross section or relative content of alloy material is again chosen depending on the desired composition of the final remelted zone.

The increase of the strength of the sidewalls of the piston ring grooves as provided by the invention secures an accurate seat for the piston ring(s) for a long useful operational life of the piston and, thus, a higher useful lifetime of the engine comprising the piston.

While the invention has been discussed in terms of remelting with an electron beam, which is presently the preferred energy beam, other energy beams, as ion beams and laser beams may be used for performing the remelting process. Also, while preferred embodiments of the invention have been shown and described, it is to be understood that the invention has been described by way of illustration rather than limitation and accordingly it is to be limited only by the appended claims taken in view of the prior art.

I claim:

1. A method of forming a piston formed with a body of aluminum alloy, which after being formed has an essentially cylindrical side surface with at least one piston ring annular groove exhibiting two side walls, with at least one side wall of said piston ring annular groove formed by application of at least one additional alloy element which is alloyed with said body of aluminum alloy and hardened by an energy beam process; which comprises applying at least one band of an additional alloy element on and around said piston body in the area in which said piston ring annular groove is to be formed, simultaneously melting said additional alloy element and portion of said piston body in the area of said additional alloy element with an energy beam to alloy said additional alloy element with said piston body portion to form an annular zone of alloyed material having a depth slightly greater than the depth of said piston ring annular groove to be formed, and forming said piston groove with at least one side wall formed by said zone of alloyed material.

2. A method as set forth in claim 1 in which said two side walls of said piston ring annular groove are formed by said zone of alloyed material.

3. A method of reinforcing an aluminum alloy piston ring groove, wherein an annular wear-resistant weld is formed by fusing the piston body to a certain depth around the periphery thereof in the zone where a ring groove is to be cut, with simultaneous introduction of an alloying addition into the molten piston alloy, whereupon the ring groove is cut in the periphery of said weld.

4. A method as claimed in claim 3, wherein said alloying addition is nickel.

* * * * *